US008130643B2

(12) United States Patent
Dattagupta et al.

(10) Patent No.: US 8,130,643 B2
(45) Date of Patent: Mar. 6, 2012

(54) SYSTEM AND METHOD FOR CONTROLLING A DATA TRANSFER OVER A NETWORK

(75) Inventors: Siddhartha Dattagupta, Fullerton, CA (US); Allen J. Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 202 days.

(21) Appl. No.: 12/419,992

(22) Filed: Apr. 7, 2009

(65) Prior Publication Data

US 2010/0254261 A1 Oct. 7, 2010

(51) Int. Cl.
*G01R 31/08* (2006.01)

(52) U.S. Cl. ........................................................ 370/230

(58) Field of Classification Search .................. 370/230, 370/235, 229, 252, 241, 254, 401, 420, 395.2, 370/395.21, 395.41
See application file for complete search history.

(56) References Cited

U.S. PATENT DOCUMENTS

| 6,026,073 | A  | * | 2/2000  | Brown et al. | 370/216 |
| 6,452,935 | B1 | * | 9/2002  | Gibbs        | 370/439 |
| 7,184,848 | B2 |   | 2/2007  | Krzyzanowski |         |
| 7,236,483 | B2 | * | 6/2007  | Yeom         | 370/352 |
| 7,286,838 | B2 |   | 10/2007 | Knauerhase   |         |

(Continued)

OTHER PUBLICATIONS

Mei-Hsuan Lu, Peter Steenkiste, and Tsuhan Chen, "Video Streaming Over 802.11 WLAN With Content-Aware Adaptive Retry," Department of Electrical and Computer Engineering, Carnegie Mellon University; © 2005 IEEE, 4 pages, Issue date Jul. 6, 2005.

*Primary Examiner* — Kwang B Yao
*Assistant Examiner* — Anh Ngoc Nguyen
(74) *Attorney, Agent, or Firm* — Patent Capital Group

(57) ABSTRACT

A method is provided in one example and includes querying for a total capacity for data transmissions for a local network segment, and identifying an available capacity for the local network segment by subtracting a sum of current aggregate consumption of the local network segment from the total capacity. The method also includes comparing the available capacity to a requested capacity that is generated by a network element for a specific communication session. If the requested capacity is equal to or greater than the available capacity, the request is withheld and not transmitted. In more specific embodiments, if the requested capacity is less than the available capacity, the request is transmitted. The query can be communicated to a gateway. In still other embodiments, the query includes a specific query as to a capacity allocated for video data and the network element is a set-top box.

24 Claims, 8 Drawing Sheets

U.S. PATENT DOCUMENTS

| | | |
|---|---|---|
| 7,293,236 B2 | 11/2007 | Choi et al. |
| 7,340,769 B2 | 3/2008 | Baugher |
| 7,373,222 B1 | 5/2008 | Wright et al. |
| 7,440,466 B2 | 10/2008 | Lord et al. |
| 2006/0002297 A1* | 1/2006 | Sand et al. .................. 370/235 |
| 2006/0250959 A1* | 11/2006 | Porat ............................ 370/230 |
| 2006/0280237 A1* | 12/2006 | Rhee et al. ................... 375/222 |
| 2007/0219953 A1* | 9/2007 | Mak ................................. 707/3 |
| 2009/0010168 A1* | 1/2009 | Yurchenko et al. .......... 370/237 |
| 2009/0116379 A1* | 5/2009 | Rahman ....................... 370/229 |

* cited by examiner

SYSTEM AND METHOD FOR CONTROLLING A DATA TRANSFER OVER A NETWORK

TECHNICAL FIELD OF THE INVENTION

The present invention relates generally to communications and, more particularly, to controlling a data transfer over the network.

BACKGROUND OF THE INVENTION

One network segment is often connected to another network segment via a gateway. Admission control schemes historically deal with the local network segment to which a flow is requesting admission. In the most simplistic form, this is used to prevent oversubscription of capacity on the local network segment (e.g., bandwidth management). There are scenarios existing today in which a local network segment may not be oversubscribed, but the next network might become oversubscribed if the local bandwidth manager admits traffic. A primary example of this is for VoIP in which the upstream capacity could be oversubscribed if a local bandwidth manager admits a call, but still has no knowledge of the maximum, available, or consumed capacity in the upstream. As new technologies have emerged, bandwidth management becomes even more imperative.

BRIEF DESCRIPTION OF THE DRAWINGS

Example embodiments will now be described, by way of example only, with reference to the accompanying drawings, in which.

DETAILED DESCRIPTION OF EXAMPLE EMBODIMENTS

Overview

A method is provided in one example and includes querying for a total capacity for data transmissions for a local network segment, and identifying an available capacity for the local network segment by subtracting a sum of current aggregate consumption of the local network segment from the total capacity. The method also includes comparing the available capacity to a requested capacity that is generated by a network element for a specific communication session. If the requested capacity is equal to or greater than the available capacity, the request is withheld and not transmitted. In more specific embodiments, if the requested capacity is less than the available capacity, the request is transmitted. The query can be communicated to a gateway. In still other embodiments, the query includes a specific query as to a capacity allocated for video data and the network element is a set-top box. In other embodiments, the query includes a specific query as to a capacity allocated for voice data and the network element is an internet protocol (IP) phone.

Figure 1:
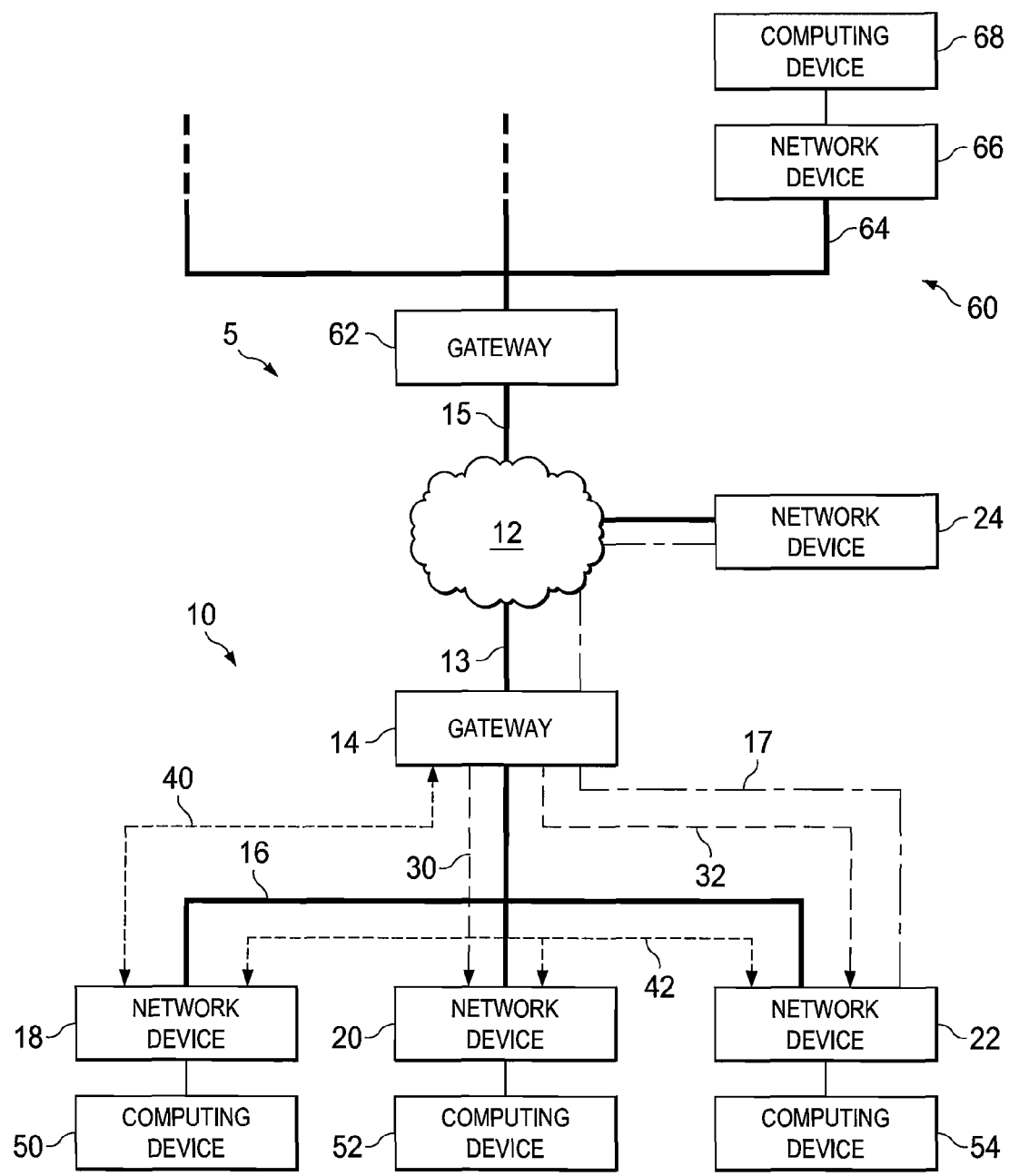
FIG. 1 is a simplified block diagram of an example embodiment of a network.

FIG. 1 is a simplified block diagram of an example embodiment of a network 5. FIG. 1 shows an embodiment of a network segment 10 of network 5, which is capable of sending data between computing devices. A computing device may be regarded as, for example, any device capable of processing data, and may comprise for example, a personal computer, a server, a portable computer or laptop, a personal digital assistant (PDA), a console gaming system, a digital cellular telephone, an Internet Protocol (IP) telephone, a set-top box, a video conferencing device, a network storage device, an IP camera, a printer, and various other devices capable of facilitating a data exchange.

In this embodiment, network segment 10 comprises a Local Area Network (LAN) 16, but it could be another type of network segment. LAN 16 comprises a network transmission medium for conveying data between nodes of LAN 16. In this embodiment, the nodes are in the form of network devices 18, 20, and 22, and a gateway 14. In an embodiment, network devices 18, 20, and 22 are endpoint connections of a respective computing device to network segment 10. Gateway 14 provides access to another network segment, which in this example, is a Wide Area Network (WAN) 12, such as the Internet, and then to a further network segment 60, via WAN 12. LAN 16 may be implemented by, for example, an Ethernet network, a wireless network, an in-home powerline network, or by another suitable network infrastructure or combination of network infrastructures. There are three network devices 18, 20, and 22 in this embodiment, but another number of network devices may be implemented in other embodiments.

Gateway 14 may comprise, for example, a router device and a switch in this embodiment. Gateway 14 may comprise a Virtual Private Network (VPN) encryption/decryption device. An access link 13 of WAN 12 connects gateway 14 to the rest of WAN 12, for example via a backbone. Access link 13 will typically be a "broadband" connection, a dial-up connection, a wireless connection, or another type of connection. Access link 13 may be implemented by, for example, optic fiber, coaxial cable, Asymmetric Digital Subscriber Line (ADSL), V.90, V.92, V.44 or another suitable type of modem over a telephone line, 3G mobile telephone standard, or other suitable platform.

Note that in a typical example, the gateway acts as an access node between the network segments and can be part of the network segments. An access link connects the WAN to the LAN via the gateway. The access link is typically the slowest portion of the network and has a limited bandwidth capacity. The bandwidth capacity limits the rate of transfer of data between network segments. The link portion is often the last leg of the connection of the rest of the WAN to the gateway and, thus, the LAN. Sometimes data transfers requested of network devices on the LAN will demand a larger transfer rate than the access link is capable of handling.

The result is congestion of the network, which can produce a performance loss in some applications, such as in the case of a video stream. This problem is not alleviated by using Quality of Service (QoS) prioritization when too large a transfer rate is required for services of the same priority. For example, if multiple video streams are demanded, which have the same QoS priority, congestion can still occur.

One prominent problem involves IPTV in which the downstream capacity could be oversubscribed if a local bandwidth manager admits an IPTV stream, but has no knowledge of the maximum, available, or consumed capacity in the downstream. Additionally, as is easily imagined, upstream capacity will be challenged by video devices (e.g., IP cameras or video conferencing terminals) that will be likely culprits to oversubscribe upstream and/or downstream capacity. Classically, VoIP and video are protected from other traffic via prioritized QoS. But in these examples, prioritized QoS is insufficient because the traffic being admitted is of the same category (Voice, Video) and, therefore, streams of identical priority compete with one another for the same resource (capacity) and QoS is subverted.

The problem is magnified when one realizes that the device most likely to mitigate this situation, namely the residential gateway, is not currently required to perform admission control on upstream or downstream requests, and neither is it required to generate requests on behalf of devices in the home network. Furthermore, devices in the access network are not equipped to handle admission control requests even if a gateway were capable of aggregating or proxying requests on behalf of devices in the home. The problem is even further magnified when one considers that there is typically more capacity available on the in-home network than there is on the broadband access network to/from (downstream/upstream) the home. A solution is needed where devices in the home can self-regulate based on learning what the upstream and downstream capacities are in the next network (i.e., the broadband access network).

Another way to illustrate the problem is oversubscription of the downstream (to the home) when multiple IP set-top boxes (STBs) are engaged in recording (scheduled or on demand). Ordinarily, an STB can manage its own local (i.e., embedded) resources (e.g., tuners) for conflict resolution of recording. However, when recording is occurring using a stream provided to an STB via a network (as opposed to directly to the STB), multiple STBs could easily oversubscribe the home network and/or the downstream if they do not coordinate their resources. Therefore, another way of looking at this problem is "conflict management and resolution via oversubscription mitigation for multiple (distributed) IP STBs in a home network." Example embodiments of the proffered architecture can provide a method by which a device requesting a stream can perform a self-regulated admission control. This method can be used to determine if the "next" network [that the traffic will be forwarded to or from] will become oversubscribed and, if so, to prevent that oversubscription from occurring. This could offer a decentralized scheme and can be used with legacy network devices and in legacy networks, as detailed below.

Returning to the infrastructure of FIG. 1, network devices 18, 20, and 22 may be connected to computing devices 50, 52, and 54 respectively or may be incorporated in the respective computing device. Network devices 18, 20, and 22 may each be, for example, a network interface card, an embedded network interface device, a wireless network interface device, or some other device capable of interfacing with other nodes of LAN 16. Network segment 60 may comprise a gateway 62, a transmission medium 64, and at least one network device 66, which may be connected to or may form part of another computing device 68. An access link 15 of WAN 12 connects gateway 62 to the rest of WAN 12. As used herein in this Specification, the term 'network segment' includes any gateway, router, firewall, web server, LAN, WAN, Wireless LAN, metropolitan area network (MAN), virtual private network (VPN), computing device, processor, or proprietary element that can receive or process data associated with bandwidth requests.

In an embodiment, a further network device 24 is connected to WAN 12. Network device 24 is connected by communication channel 17 established over the relevant network segments so as to be a virtual part of network segment 10. Network device 24 may be connected to another computing device (not shown) or may be incorporated in the other computing device. In the embodiment of FIG. 1, network device 20 is receiving data by communication 30 from WAN 12 via gateway 14 and LAN 16. Network device 22 is receiving data by communication 32 from WAN 12 via gateway 14 and LAN 16.

A communication over LAN 16 between network device 18 and gateway 14 is represented by 40. A communication over LAN 16 between network device 18 and network devices 20 and 22 is represented by 42. Communications 40 and 42 may comprise datagrams conveying control messages or substantive data transfers between computing devices 50, 52, 54, or 68. In an embodiment, when communications 40 and 42 are control messages, they may be implemented with a Universal Plug and Play (UPnP) communication or other suitable device-to-device communication protocol. When communications 40 and 42 are substantive data transfers, they may be implemented by for example TCP/IP or other suitable protocols.

In an embodiment, network device 18 is able to receive a request for a data transfer from computing device 50 or from another computing device 52, 54 via LAN 16, or possibly from computing device 68 via gateway 14, WAN 12, and network device 66, or from another device or system. An apparatus is configured to assess whether the requested data transfer can be serviced as described below. In an embodiment, the apparatus is computing device 50 or network device 18. For purposes of the examples below, it will be assumed that network device 18 will make this assessment. In some implementations where network device 18 has limited functions, the assessment is better made by computing device 50. A minimum required transfer rate or bit rate is needed for many types of data transfer, such that if the actual transfer rate drops below the required rate, then a loss of performance may result. Typically this is important for streamed data transfers, such as audio and video data transfers, but it need not be limited to streamed data. In an embodiment, the transfer request involves a transfer of data over one or more network segments of network 5, including network segment 10, WAN 12, or network segment 60 depending on the other party or parties to the data transfer. In an embodiment, the assessment performed by the apparatus is whether or not one or more of the network segments or one or more sub-segments of these segments can service the data transfer.

Figure 2:
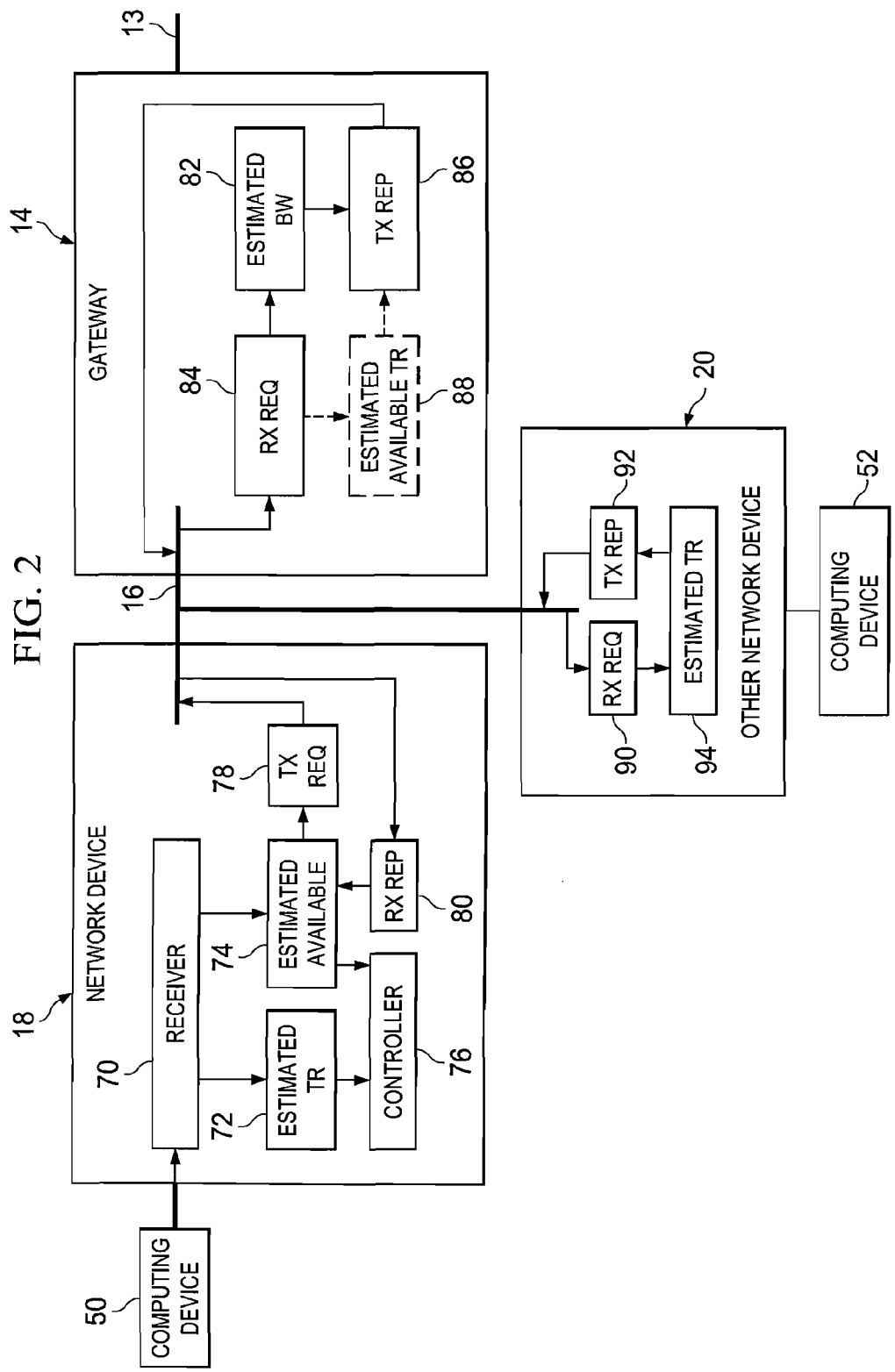
FIG. 2 is a simplified block diagram of an example embodiment of a network device, another network device, and a gateway of the network of FIG. 1.

FIG. 2 illustrates network device 18, network device 20, and gateway 14 in more detail. Network device 18 comprises a receiver component 70, a transfer rate estimator component 72, an available transfer rate estimator component 74, and a controller component 76. In an embodiment, components 70, 72, 74, and 76 may be implemented as one or more data processors and electronic circuitry configured to operate under the control of logic embodied in tangible media (such as RAM, flash memory or ROM). In an embodiment, the logic is in the form of a computer program or firmware, which comprises instructions which when executed control the circuitry and/or the one or more data processors of network device 18 to operate as described below. In another embodiment, one or more of components 70, 72, 74, or 76 may be implemented by computing device 50.

Receiver component 70 is configured to receive a data transfer request. In this example, the request is from computing device 50, but it may be from elsewhere in the network. In this example, the requested data transfer is to download data from computing device 68 to computing device 50 and the network segment being assessed is access link 13. Upon receipt of the data transfer request, receiver component 70 causes transfer rate estimator component 72 to estimate the transfer rate required to perform the requested data transfer as described further below. The estimate of the required transfer rate is provided to controller component 76. Also, upon receipt of the data transfer request, receiver component 70 causes the available transfer rate estimator component 74 to estimate the available transfer rate of the network segment being assessed. The available transfer rate estimator component 74 comprises a transmit request component 78 and a receive reply component 80. Transmit request component 78 is configured to transmit a request (for example to gateway 14, and in one embodiment, to the other network device 20) for information used to determine the available transfer rate of the network segment being assessed. The receive reply component 80 is configured to receive a reply to the transmitted request(s). The available transfer rate estimator component 74 is configured to estimate the available transfer rate of the network segment being assessed from the reply (replies), as described further below. The estimate of the available transfer rate of the network segment being assessed is provided to controller component 76.

Controller component 76 is configured to determine whether the network segment being assessed is able to handle the requested data transfer based on the estimate of the required transfer rate and the available transfer rate of the network segment being assessed as described further below. Controller component 76 is configured to allow network device 18 to accept the transfer request or deny the transfer request based on whether the network segment being assessed is able to handle the requested data transfer.

Gateway 14 comprises an estimate bandwidth component 82, a receive request component 84, and a transmit reply component 86. In an embodiment, gateway 14 also comprises an estimate available transfer rate component 88. Components 82, 84, 86, and 88 may be implemented as one or more processors and electronic circuitry configured to operate under the control of logic embodied in the tangible media. The logic is in the form of computer software or firmware which comprises instructions, which when executed, control the circuitry and/or the one or more processors of gateway 14 to operate as described below.

Estimate bandwidth component 82 is configured to estimate or determine the bandwidth (transfer rate capacity) of access link 13. Receive request component 84 is configured to receive a request from network device 18 for information to determine the available transfer rate of access link 13 when the network segment being assessed is access link 13. Transmit reply component 86 is configured to transmit a reply to network device 18 with information to determine the available transfer rate of the network segment being assessed (access link 13). In one embodiment, the receive request component 84 causes the estimate bandwidth component 82 to provide the (estimated or determined) bandwidth of access link 13 to the transmit reply component 86 when the network segment being assessed is access link 13. The transmit reply component 86 uses the bandwidth as the information to determine the available transfer rate of the network segment being assessed.

In another embodiment, the estimate available transfer rate component 84 is configured to estimate the unused portion of the available bandwidth of access link 13 when the network segment being assessed is access link 13. The estimate available transfer rate component 84 may use the bandwidth from the estimate bandwidth component 82. Receive request component 84 causes the estimate available transfer rate component 88 to provide the estimated available (unused) transfer rate of access link 13 to the transmit reply component 86 when the network segment being assessed is access link 13. The transmit reply component 86 uses the available transfer rate as a reply to the request for information used to determine the available transfer rate of the network segment being assessed from component 78.

Network device 20 comprises a receive request component 90, a transmit reply component 92, and an estimate transfer rate component 94. Other network devices on network segment 10 may be implemented in a similar manner to network device 20. Components 90, 92, and 94 may be implemented as one or more processors and electronic circuitry configured to operate under the control of logic embodied in the tangible media. The logic is in the form of computer software or firmware which comprises instructions, which when executed, control the circuitry and/or the one or more processors of network device 20 to operate as described below. In another embodiment, the components 90, 92 and 84 may be implemented by the computing device 52.

The receive request component 90 is configured to receive a request from network device 18 for information to determine the available transfer rate of the network segment. The estimate transfer rate component 94 is configured to estimate or determine the transfer rate of a data transfer being undertaken by network device 20 through the network segment being assessed. For example, the transfer rate is that of a data transfer through access link 13 by network device 20 when the network segment being assessed is access link 13. The transmit reply component 92 is configured to transmit a reply to network device 18 with information used to determine the available transfer rate of the network segment being assessed. Upon receipt of the request from network device 18, the receive request component 90 causes the estimate transfer rate component 94 to provide the estimated transfer rate to the transmit reply component 92. The transmit reply component 92 uses the transfer rate from component 94 as the information in a reply to the request from component 78.

Figure 3:
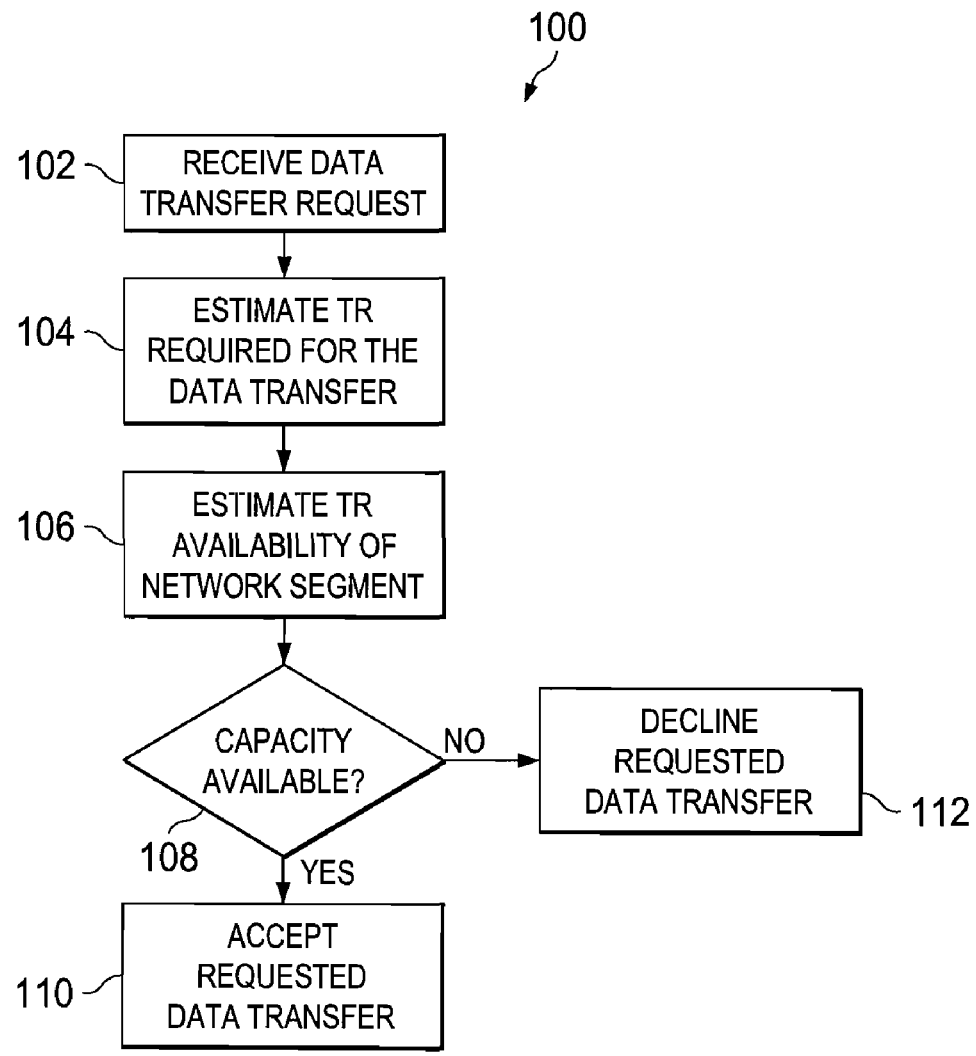
FIG. 3 is an example flowchart of an embodiment of a method of controlling a network.

An embodiment of a method 100 of controlling a data transfer over a network 5 is shown in FIG. 3. The method 100 commences at 102 where network device 18 receives a request to undertake a data transfer. Such a request may be received for example by component 70. The request may be from computing device 50 (for example, if a download is sought) or it may originate from elsewhere in the network, (for example, if a Voice over Internet Protocol (VoIP) call is placed to computing device 50). In a further example the data transfer request may be to conduct an upload to computing device 50 from computing device 68.

Network device 18 estimates 104 the data transfer rate required in order to conduct the data transfer request. Network device 18 can do this by, for example, component 72 being provided with the transfer rate required. For example, the required transfer rate of a download requested by computing device 50 is provided or the required transfer rate of an upload to computing device 50 is provided by network device 66. Alternatively, component 72 of network device 18 can estimate the required transfer rate itself based on the type of data being transferred. For example, depending on the CODEC used, a VoIP call may be assumed to require 20 kbps of bandwidth; or, depending on MPEG encoding and resolution, a video download may be assumed to require 1.5 Mbps. These amounts could be adjusted according to the actual CODEC/MPEG/resolution etc. It is desirable that the units of the amounts be common. Therefore, a conversion can take place if necessary. For example, 1.5 Mega bits per second (Mbps) can be converted to 1500 kilo bits per second (kbps). Network device 18 then estimates 106 the available data transfer rate of the network segment being assessed, such as for example by use of component 74. This may be the transfer rate of and/or to network segment 10. The available data transfer rate is the unused portion of the bandwidth or transfer rate capacity of the network segment being assessed.

In an embodiment, when the data transfer is via access link 13 and gateway 14, network device 18 estimates the available transfer rate of access link 13, as this is usually the slowest part of the path and gateway 14 usually forms part of the local network. In an embodiment, component 78 of network device 18 requests the available transfer rate of access link 13 from gateway 14 via communication 40. Gateway 14 can respond [for example] using component 86 with a transfer rate availability amount via communication 40. For example, the gateway could return an amount of 100 (kbps). Gateway 14 may continuously, periodically, or on-demand determine the available transfer rate of access link 13, by for example using the estimate available transfer rate component 88.

Network device 18 then determines 108 whether the network segment being assessed, such as access link 13, has capacity for network device 18 to undertake the requested data transfer, for example using component 76. In an embodiment, a determination of whether the network segment being assessed has capacity to undertake the requested data transfer occurs by comparing the transfer rate of the requested transfer to the available transfer rate. If the available transfer rate is equal to or more than the requested transfer rate, then the network segment is regarded as having the capacity to handle the data transfer. Otherwise, or if the available transfer rate is less than the requested transfer rate, then the network segment is regarded as not having capacity to accept the data transfer. If all of the assessed network segments can handle the requested data transfer, the network is regarded as having the capacity to handle the request. Consequently network device 18 will accept 110 the data transfer request. Alternatively, if there is insufficient capacity in one or more of the network segments, then network device 18 will decline 112 the data transfer request.

In an example, the requested data transfer is for a VoIP call and the expected bit rate of the data transfer is 20 (kbps upload). The returned amount from the gateway is 100 (kbps upload). Network device 18 can, therefore, determine that 20 is less than 100 and can, therefore, accept the data transfer. In another example, the requested data transfer is for a video download and the expected bit rate of the data transfer is 1500 (kbps download). The returned amount from the gateway is 100 (kbps download). Network device 18 can, therefore, determine that 1500 is more than 100 and can, therefore, decline the data transfer.

In an embodiment, network device 18 also estimates the transfer rate availability of LAN 16, as this is local to network device 18. Network device 18 determines whether LAN 16 has the capacity to undertake the requested data transfer. In another embodiment, network device 18 can assess whether other remote network segments (for example, the access link 15 or transmission medium 64), or a node of the network has/have the capacity to undertake the requested data transfer. In one embodiment, it is assumed that the remote network segments have their own local network access control service.

Figure 4:
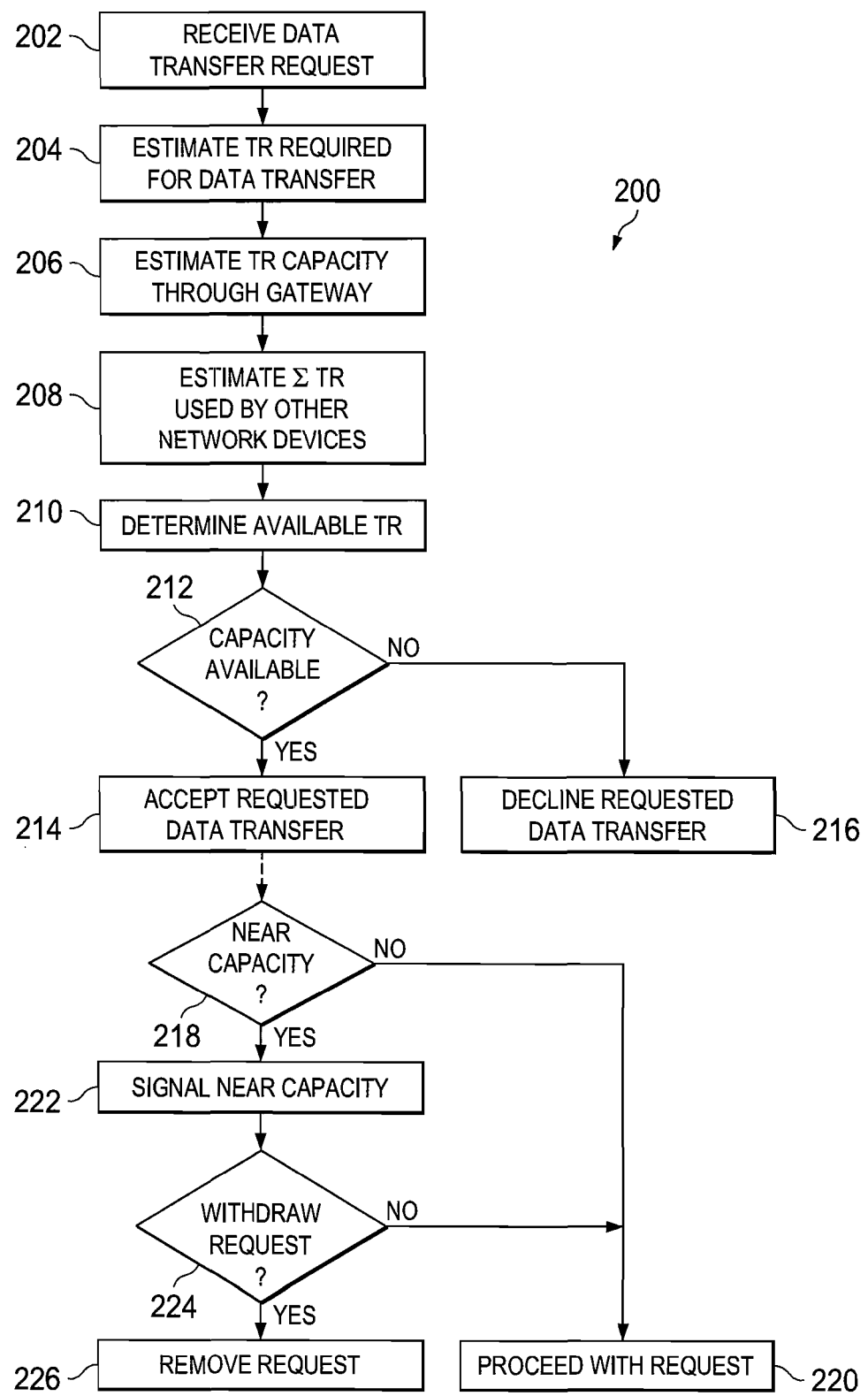
FIG. 4 is an example flowchart of another embodiment of a method of controlling a network.

FIG. 4 shows a more sophisticated method 200 of controlling access to network segment 10. In this embodiment, the method 200 commences with network device 18 receiving at 202 a request for a data transfer. Network device 18 then estimates at 204 the bandwidth required for the data transfer, as described above. An estimate of the available transfer rate of one or more network segments or through one or more nodes other than network device is then obtained. When assessing the available transfer rate through a node, the available transfer rate may be due to a limitation of the node itself or a limitation may be imposed on the node by other parts of the network. For example, gateway 14 may be limited by the transfer rate of access link 13. In this example, the available capacity through gateway 14 (as limited by access link 13) is obtained at 206. In practical terms the capacity of gateway 14 is the available capacity of access link 13 and, therefore, it is described as such for this example. The available capacity may be obtained by network device 18 querying gateway 14 for the available or unused transfer rate taking into account current traffic through access link 13, however in this example, network device 18 queries gateway 14 for the total capacity or bandwidth of gateway 14 as determined by component 82. If the response from gateway 14 is its bandwidth, this may be stored by network device 18 for a period of time for later reuse.

The request for the bandwidth is sent by a message in communication 40. Gateway 14 replies with a reply message in communication 40 comprising a bandwidth. Typically this is the case when the estimate available transfer rate component 88 is not implemented. Network device 18 then has at 206 an estimate of the bandwidth of access link 13 from gateway 14. Network device 18 also requests each of network devices 20 and 22 to return its transfer rate currently being transferred through access link 13 in message 42. If other network devices are on LAN 16, then the same requests can also be sent to them as well.

Each network device can respond with a transfer rate currently being transferred over access link 13 by message in communication 42. Network device 18 can then estimate the current transfer rate through access link 13 by the other network devices 20 and 22 by adding together the transfer rates used by network devices 20 and 22 and any other network devices on LAN 16, at 208.

The available (unused) transfer rate of access link 13 is then determined at 210 based on the bandwidth of access link 13 and the sum of the transfer rates used by network devices 20 and 22. Typically the sum of the transfer rates used by network devices 20 and 22 is subtracted from the bandwidth to determine the currently available transfer rate of access link 13. Network device 18 then compares at 212 the transfer rate required by network device 18 with the determined amount of available transfer rate. Network device 18 is then able to determine for itself whether the network, and in particular, for example, whether access link 13 is currently likely to have available capacity to accept the requested data transfer. If there is insufficient capacity, then the requested data transfer is declined at 216. If there is available capacity, then network device will accept the requested data transfer at 214.

Optionally, network device 18 may determine at 218 whether the requested data transfer will bring access link 13 near to capacity. In the event that there is plenty of capacity available (that is it is not near capacity), then it will proceed to 220 with the request. In the event that the requested data transfer will take access link 13 to near capacity, for example it will only leave 5-10% of the transfer rate available, or more preferably 1-2%, then network device 18 will signal that the requested transfer will bring access link 13 to near capacity at 222. This will then trigger the requesting agent of the data transfer to query at 224 whether the request should be withdrawn. This may be an automated decision or the request may be put to a user. If the request is not withdrawn, then the transfer request will proceed to 220. In the event the request is withdrawn, then the request is removed at 226 from consideration by network device 18.

In an example, the requested data transfer is for a video download and the expected bit rate of the data transfer is 1500 (kbps download). The returned bandwidth of access link 13 from the gateway is 5000 (kbps download). The returned amount from the other devices 20 and 22 are 1500 (kbps download) and 1900 (kbps download). Network device 18 can then determine that access link 13 has 1600 (kbps download) available. Network device 18 can, therefore, determine that 1500 is less than 1600 and can, therefore, accept the data transfer. However, network device might consider that this will bring the network to near capacity and could request the download be withdrawn.

In another example, the requested data transfer is for a video download and the expected bit rate of the data transfer is 1500 (kbps download). The returned amount from the other devices 20 and 22 are 1500 (kbps download) and 3000 (kbps download), respectively. Network device 18 can then determine that the gateway has 500 (kbps download) available. Network device 18 can, therefore, determine that 1500 is more than 500 and can, therefore, decline the data transfer.

In an embodiment, the transfer rate is the amount allocated to a certain type of traffic, for example video, voice etc. Thus, transfer rate amounts can be determined for upload and download, and for video, voice etc as needed to determine whether the network has capacity for the requested transfer of the respective data type. Embodiments can be used with other admission control schemes that deal with requests for admission to network segment 10 so as to prevent oversubscription of capacity on network segment 10.

Figure 5:
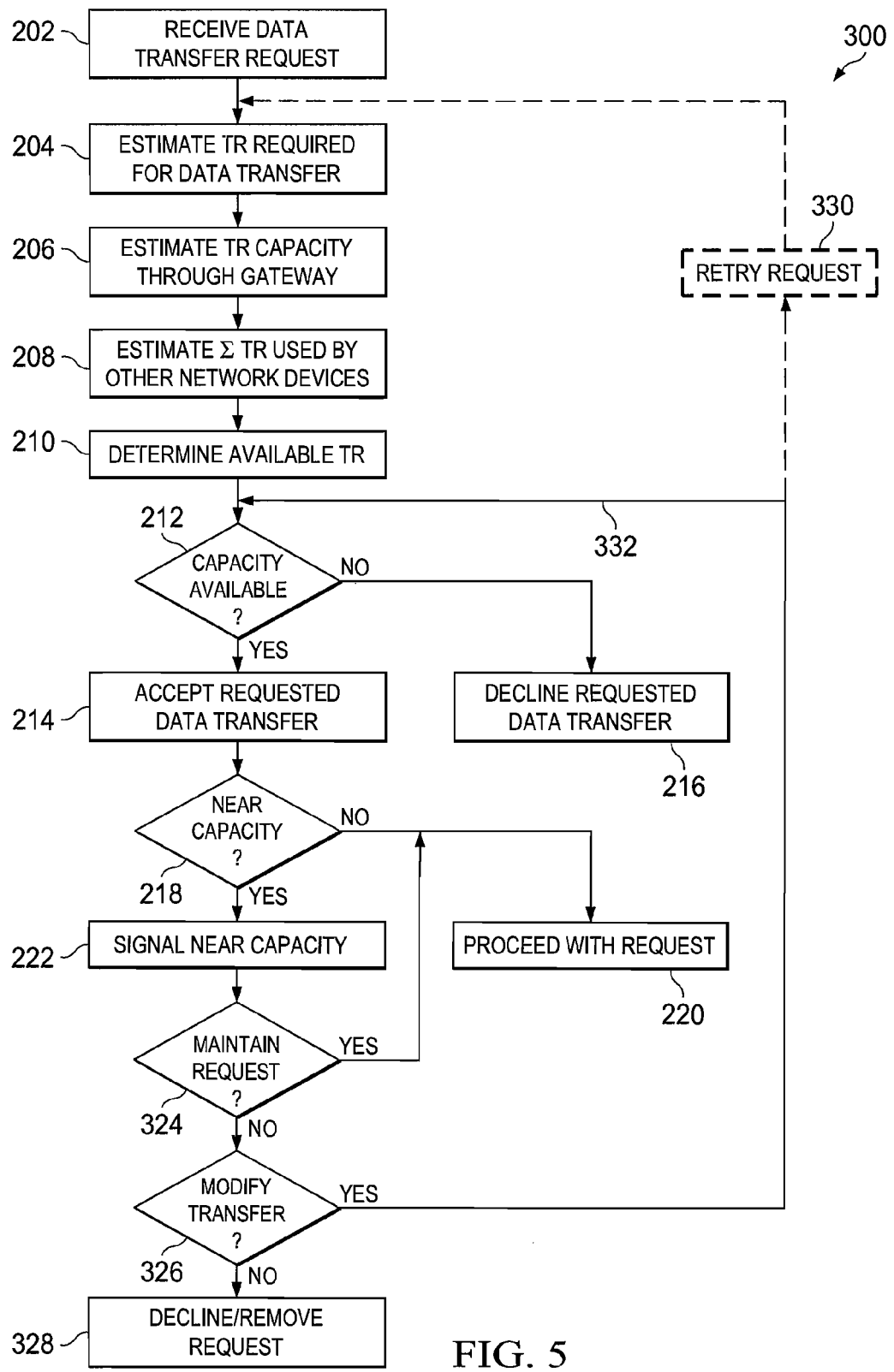
FIG. 5 is an example flowchart of a further embodiment of a method of controlling a network.

FIG. 5 shows an alternative method 300 of controlling access to network segment 10. In this method 300, most of the steps are the same as in method 200; however, if the network segment being assessed is near capacity 222, a check 324 may be performed as to whether the request is to be maintained. If the request is to be maintained it proceeds 220. If the request is not to be maintained 326 or if the requested data transfer is declined 216, then a check 328 may be perform as to whether the data transfer can be modified to require a lower transfer rate. For example, lower quality video resolution may be available and acceptable. If the request cannot be modified 330, then the request will be removed or remain declined 332. However, if the request can be modified 334, then a check 212 of whether the network segment being assessed can handle the new request with the new transfer rate is performed 332. It may be necessary to retry the request 330 with a re-estimate of the new required transfer rate of the data transfer at 204. This may be an automated decision or a request to try to modify the data transfer may be put to a user.

An example of use of an embodiment is now described. The network segment 64 may not be overloaded or congested, but access link 13 might become overloaded if a bandwidth manager of network segment 64 admits traffic. For example, an attempt is made to receive an inbound VoIP call at computing device 50 (such as when device 50 is a VoIP telephone) from a computing device 68 when computing device 68 comprises a VoIP telephone. If a bandwidth manager of the network segment 64 admits a call, but has no knowledge of the maximum available or consumed capacity in the downstream, then the downstream network (which would be network segment 10) may meet or exceed capacity available to it through access link 13. However, if network device 18 determines that the local network segment 10 and/or access link 13 would not have sufficient capacity, then receipt of the call can be declined. As an extension, network device 66 could determine whether the network segment 64 and access link 15 has capacity to place the call.

In an embodiment, computing device 50 is a VoIP telephone, which comprises network device 18. If the VoIP telephone attempts to make an outbound VoIP call to a VoIP telephone comprising network device 66, then the VoIP telephone can check if the outbound call will overload access link 13 in a similar manner. Further, the VoIP telephone could query the residential gateway 14 as to what is the currently available upstream capacity of access link 13. This can be done via UPnP Internet Gateway Device (IGD) protocol or the DSL Forum's Technical Report-064 (TR-064) protocol, or by other mechanisms. If available, network device 18 could specifically query as to the bandwidth allocated for voice. If this is not available, then the total bandwidth could be requested and a conservative estimate can be used for estimating the percentage of upstream allocated to voice.

The VoIP telephone can next query other VoIP telephones (and other sources) in network segment 10 as to what upload voice data transfer capacity they are currently utilizing. This could be accomplished via the universal plug and play (UPnP) AV protocol, UPnP QoS protocol, or other mechanisms. The VoIP telephone could then subtract the sum of all source capacity utilization (sum individual upstreams for aggregate total upstream consumption) from the currently available total upstream capacity for voice and compare that to the requested capacity. If the requested capacity is equal to or greater than the difference calculated, the VoIP telephone could decline to make the call and could inform the user than the access network is busy. Optionally the VoIP telephone can inform the user that the home network is fine.

Another example of use of an embodiment is where computing device 50 is an IP Set-Top Box (IPSTB) and a user of the IPSTB requests download of an Internet Protocol Television (IPTV) stream (possibly from a computing device 68 in which the downstream capacity of access link 13 to gateway 14 would be overloaded if a local bandwidth manager admits the IPTV stream. However, the local bandwidth manager may have no knowledge of the maximum available or consumed capacity of access link 13. In an embodiment, the IPSTB can determine if it should admit the requested data stream based on the local utilization of network segment 10 and the capacity of access link 13.

More specifically, the IPSTB may be configured to determine if it is joining a stream that has already been admitted to LAN 16, such that when an IP multicast stream for the same stream is already established, there may be no additional capacity consumed by adding an additional sink for the stream in the form of the requesting network device 18. That is the requested data transfer will require zero additional transfer rate so long as no replication of the existing stream is required in the network segment. If however replication is required over a network segment, such as because of network capability or topology reasons, the data transfer is treated as if it were a unicast and the required transfer rate could be determined as if the stream were unicast. The IPSTB can query other IPSTBs (and other sinks) in the local network segment 10 as what capacity they are currently utilizing. This can be accomplished via UPnP AV, UPnP QoS, or other mechanisms.

The IPSTB could next query gateway 14 as to the currently available downstream total capacity of access link 13. This can be done via UPnP IGD or TR-064 or other mechanisms. If available, the IPSTB could specifically query as to the capacity allocated for video. If this is not available, then the total capacity could be requested and a conservative estimate could be used for estimating the percentage of downstream allocated to video. This is typically the majority of the capacity.

The IPSTB can then subtract the sum of all sink capacity utilization (sum of individual downstreams for aggregate total downstream consumption) from the currently available total downstream capacity and compare that to the requested transfer rate. If the requested transfer rate is equal to or greater than the difference calculated, the IPSTB should not request the stream and could inform the user than the access network is busy. Optionally the STB can inform the user that the home network is fine, which could aid in technical support resolution.

In an embodiment, network device 18 can monitor multicast traffic for joins and leaves for the purpose of "bandwidth accounting." Network device 18 may be aware that the date transfer relates to a multicast and can thus handle the data request appropriately. A multicast stream can be added via UPnP AV. Multicast awareness can be achieved by data packet snooping. Furthermore, UPnP QoS can be setup for different physical paths in the home. For example, an IPSTB on wireless and an IPSTB on powerline may have joined the same multicast group. As a consequence access link 13 may only need to send one data stream which is replicated on each extra physical path. The data transfer rate of the multicast remains the same, therefore, a requesting device may calculate the transfer rate through access link 13 to be the same as if the request where allowed because in this embodiment the stream does not consume additional downstream transfer rate of access link 13, even though they may have different paths for QoS setup and bandwidth accounting and thus consume additional bandwidth capacity in network segment 10.

Figure 6:
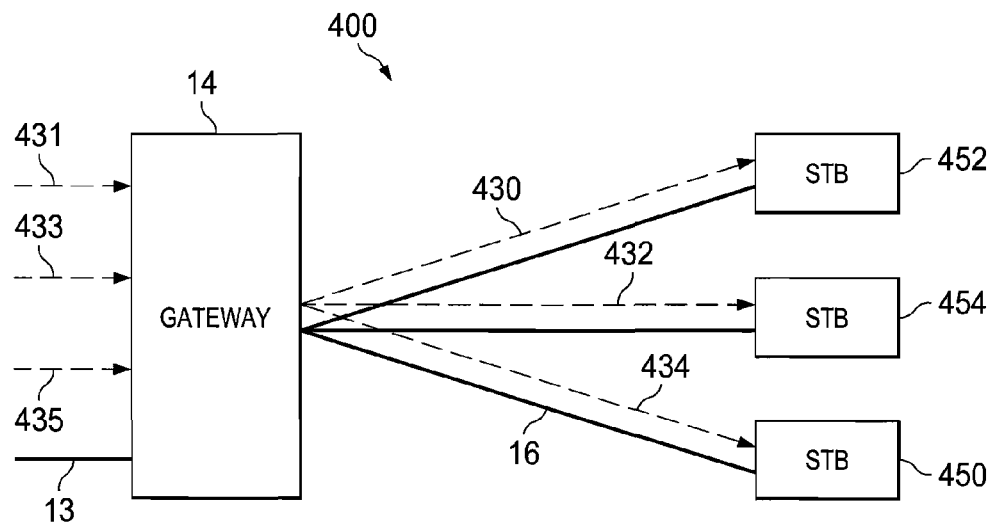
FIG. 6 is a simplified block diagram showing example data transfers according to a first scenario in an embodiment of a network.

Referring to FIG. 6, a first example scenario 400 is shown. In this scenario, 400 there are three set-top boxes (STBs) 452, 454 and 450, each of which comprises a network device. The STBs are connected to gateway 14 and form LAN 16. Gateway 14 receives a download stream from the WAN via access link 13. STB 452 is downloading a first IP unicast 430, STB 454 is downloading a second IP unicast 432, and STB 450 requests download of a third IP unicast 434. Access link 13 downloads the first unicast 431 and the second unicast 433. If STB 450 is permitted to download unicast 434 it will be downloaded over the access link as 435. Each of the unicasts can be different.

In this scenario, STB 450 can check if LAN 16 can handle the download. If TR1+TR2+TR3>LANmax then unicast 434 is denied. TR1 is the transfer rate of the first unicast 430. TR2 is the transfer rate of the second unicast 432. TR3 is the expected transfer rate of the thirst unicast 434. LANmax is the transfer rate that LAN 16 can handle. It is noted that this can also be calculated as: If TR3>LANmax−TR1−TR2, then unicast 434 is denied. Also STB 450 can check if access link 13 can handle the download. If TR1+TR2+TR3>ALmax, then unicast 434 is denied. TR1 is the transfer rate of the first unicast 431. TR2 is the transfer rate of the second unicast 433. TR3 is the expected transfer rate of the third unicast 435. ALmax is the transfer rate that access link 13 can handle. If is noted that this can also be calculated as: If TR3>ALmax−TR1−TR2 the unicast 434 is denied.

Figure 7:
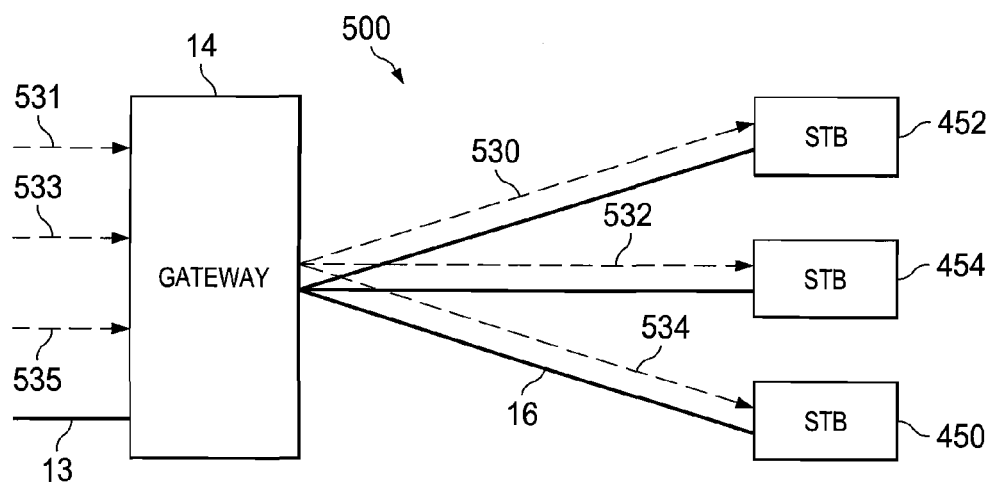
FIG. 7 is a simplified block diagram showing example data transfers according to a second scenario in an embodiment of a network.

Referring to FIG. 7, a second example scenario 500 is shown. In this scenario 500, the STBs 452, 454 and 450, gateway 14, LAN 16, and access link 13 are the same as scenario 400. STB 452 is downloading a first IP multicast 530, STB 454 is downloading a second IP multicast 532, and STB 450 requests download of a third IP multicast 534. Access link 13 downloads the first multicast 531 and the second multicast 533. If STB 450 is permitted to download multicast 534 it will be downloaded over the access link as 535. Each of the multicasts is different. In this scenario, STB 450 can check if LAN 16 can handle the download and the STB 450 can also check if access link 13 can handle the download the same as in scenario 400.

Figure 8:
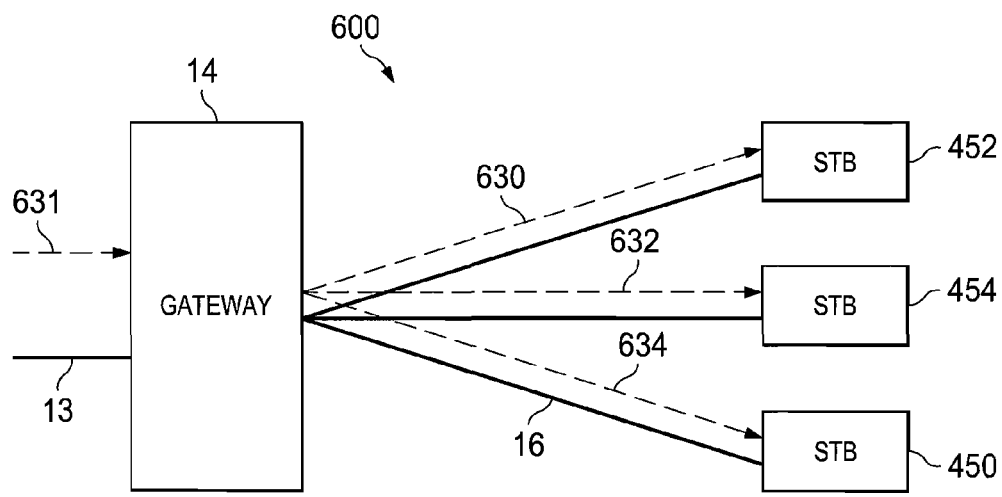
FIG. 8 is a simplified block diagram showing example data transfers according to a third scenario in an embodiment of a network.

Referring to FIG. 8, a third example scenario 600 is shown. In this scenario 600, the STBs 452, 454 and 450, gateway 14, LAN 16, and access link 13 are the same as scenario 400. STB 452 is downloading a first IP multicast 630, STB 454 is downloading the same IP multicast 632, and STB 450 requests download of the same IP multicast 634. Access link 13 downloads the first multicast 631. In this embodiment gateway 14 and LAN 16 provide a shared medium in which the multicast need only be transmitted once and all of the STBs 452, 454 and 450 consume the same transmission of the data stream. This may be achieved by Layer 2 multicast encapsulation of the data stream.

In this scenario, STB 450 can check if LAN 16 can handle the download. If TR1+TR2+TR3>LANmax, then joining multicast 434 is denied. TR1 is the transfer rate of the multicast 630. TR2 is zero because there is no additional transfer rate contributed by the download of the multicast 632. TR3 is also zero because there is no additional expected transfer rate contributed by the download of the multicast 634. In order to determine that TR2 and TR3 are zero the STB 450 can have multicast awareness, which is described further below. Also, STB 450 can check if access link 13 can handle the download. If TR1+TR2+TR3>ALmax, then joining multicast 634 is denied. TR1 is the transfer rate of the multicast 631. TR2 is zero and TR3 is also zero for the same reason above.

Figure 9:
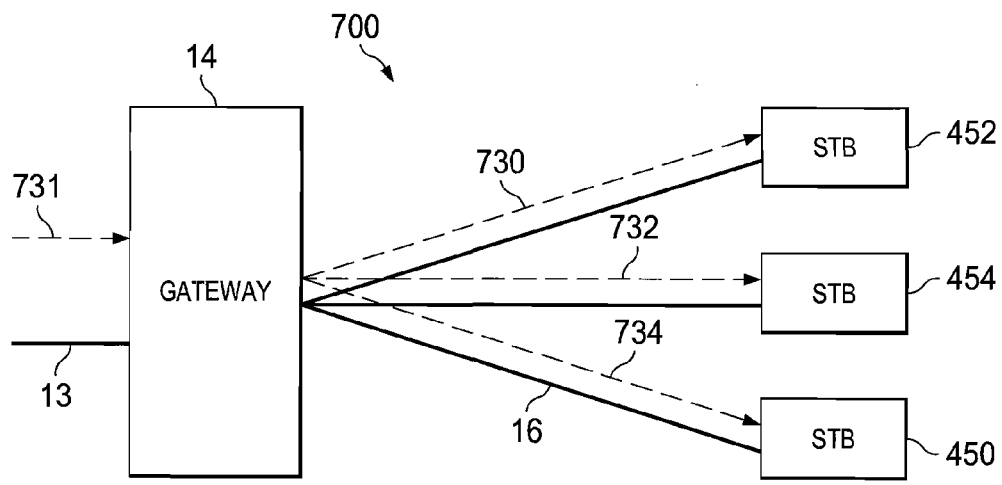
FIG. 9 is a simplified block diagram showing example data transfers according to a fourth scenario in an embodiment of a network.

Referring to FIG. 9, a fourth example scenario 700 is shown. In this scenario 700, the STBs 452, 454 and 450, gateway 14, LAN 16, and access link 13 are the same as scenario 400. STB 452 is downloading a first IP multicast 730, STB 454 is downloading the same IP multicast 732, and STB 450 requests download of the same IP multicast 734. Access link 13 downloads the multicast 731. In this embodiment gateway 14 and LAN 16 provide a shared medium in which the multicast needs to be replicated so that each of the STBs 452, 454 and 450 receive their own replicated version of the data stream. This may be achieved by Layer 3 multicast to Layer 2 unicast encapsulation with replication of the data stream.

In this scenario, STB 450 can check if LAN 16 can handle the download. If TR1+TR2+TR3>LANmax, then joining multicast 734 is denied. TR1 is the transfer rate of the multicast 730. TR2 is the transfer rate of the multicast 732. TR3 is the transfer rate of the multicast 734. Also STB 450 can check if access link 13 can handle the download. If TR1+TR2+TR3>ALmax, then joining multicast 434 is denied. TR1 is the transfer rate of the multicast 631. TR2 is zero and TR3 is also zero because only one stream needs to be downloaded to gateway 14. Due to the replication LAN 16 could become oversubscribed even though access link 13 may have a slower bandwidth. The STB 450 can again use multicast awareness to determine that TR2 and TR3 are zero.

In this scenario, "multicast awareness" is multicast over unicast encapsulation awareness or multicast over shared media awareness in a heterogeneous media LAN or in a homogeneous shared media LAN. When scenario 600 is compared with scenario 700, it can be seen that in scenario 600, STB 450 needs to be aware that its requested download will not contribute to the volume of data over access link 13. Its requested download will not contribute to the data volume sent of the LAN because it is broadcast over the LAN. In contrast in scenario 700, STB 450 needs to be aware that even though the data transfer rate of multicast 731 is the same as multicast 631 the unicast encapsulation and replication will mean that the data volume of LAN 16 is not the same as in scenario 600. It may be 3 times the volume, in this example. STB 450, therefore, needs to be aware of multicast over unicast encapsulation so as to correctly determine the relevant data transfer rate of each network segment according to the type of multicast, that is, by broadcast or by unicast encapsulation and replication.

Figure 10:
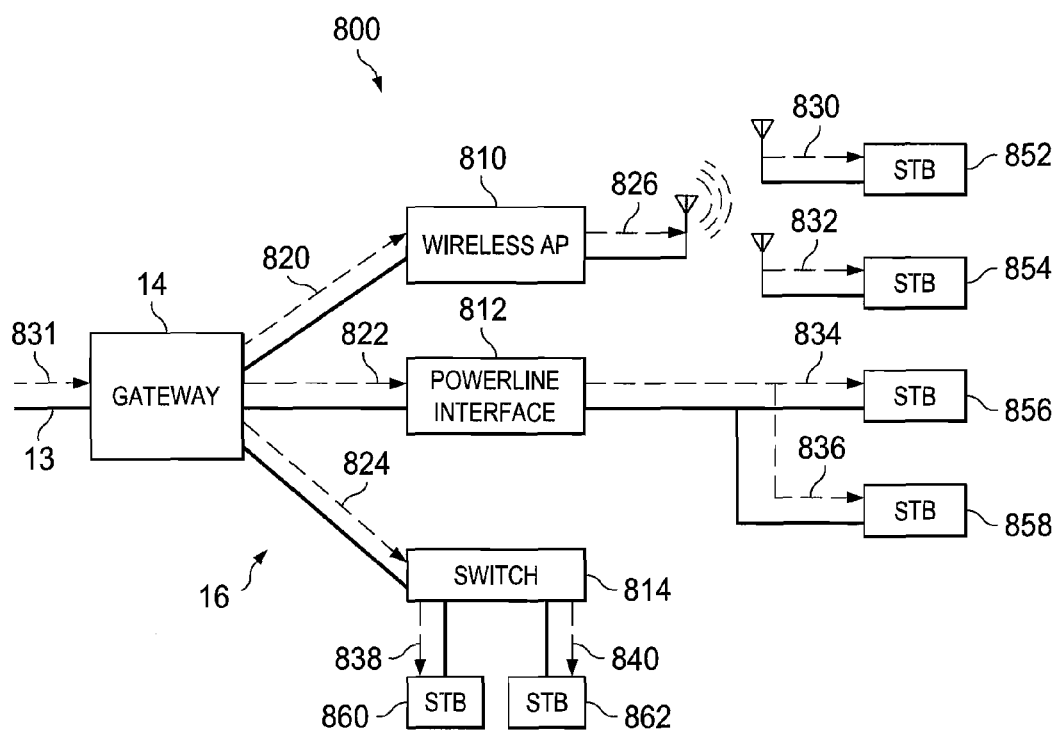
FIG. 10 is a simplified block diagram showing example data transfers according to a fifth scenario in an embodiment of a network segment.

Referring to FIG. 10, a fifth example scenario 800 is shown. In this scenario 800, the local network segment 16 comprises a number of different media. In particular, in this embodiment the segment 16 comprises a wireless access point (AP) 810 for providing a wireless sub-segment, a powerline interface 812 for providing a sub-segment over main power-lines in a building, and a switch 814 for providing a wired sub-segment. STBs 852 and 854 are in the wireless sub-segment. STBs 856 and 858 are in the powerline sub-segment. The wireless sub-segment shares the bandwidth available. The powerline sub-segment shares the bandwidth available. STBs 860 and 862 are in the wired sub-segment. Gateway 14 and access link 13 are the same as before. Gateway 14 operates as a switch connecting the wireless AP 810, powerline interface 812, and the switch 814 together.

In one embodiment, the wireless AP 810 and the powerline interface 812 each replicate the multicast (multicast to unicast encapsulation) for their respective STBs. The multicast stream from the wireless AP 810 to STBs 852 and 854 is 826, 830, and 832. The multicast stream from the powerline interface 812 to STBs 856 and 858 is 834 and 836. Data stream 824 from gateway 14 to the switch 814 comprises a stream 838 forwarded to the STB 860 and a stream 840 forwarded to the STB 862. In this embodiment multicast streams 820, 822 and 824 from gateway 14 to the wireless AP 810, powerline interface 812 is replicated by gateway 14 from the multicast 831 on access link 13. In this embodiment the transfer rate of each stream 831, 820, 822, 826, 830, 832, 834, 836, 838, and 840 may not all be at the same rate due to the replications. Stream 824 may not be at the same transfer rate.

In another embodiment, the wireless AP 810, the powerline interface 812, and the switch 814 do not replicate the multicast for their respective STBs. The replication is conducted by gateway 14. In this case date transfers 820, 822 and 824 will each comprise 826 (and 830 and 832), 834 and 836, and 838 and 840, respectively, thereby reducing the available transfer rate on gateway 14 to wireless AP 810 sub-segment, gateway 14 to powerline interface 812 sub-segment and gateway 14 to switch 814 sub-segment. In another embodiment, some, but not all of the wireless AP 810, the powerline interface 812 and the switch 814 replicate the multicast for their respective STBs, with consequential increases in the transfer rates where replication does not occur.

In another embodiment, gateway 14 does not replicate the multicast. In this case the transfer 831 will comprise multiple transfers similar to scenario 500. A data transfer requesting STB can check if LAN 16 can handle the download by accounting for where multicast replication occurs and for the bandwidth available in the respective sub-segment. Network device may comprise an identifier for identifying the presence of a multicast capable data stream. The identifier may be configured to identify that the data stream is the same as a requested data stream.

Network device 18 may be configured to determine the network path from computing device 50 to the data source/destination of the requested data transfer and assess whether one or more of the network segments along the path can handle the requested data transfer. In an embodiment, this is determined by using a trace-route. In another embodiment, a ping return time is used to decide whether the path is via access link 13. In an embodiment, network device 18 may be configured to assess whether access link 13 is capable of handling the requested data transfer and whether LAN 16 is capable of handling the requested data transfer. It is possible for the querying of capacity to progressively extend along links in the network from one node to another. Thus, for example gateway 14 can query gateway 62 as to the capacity of access link 17 and/or network segment 64.

It is desirable for every network device in the local network segment to be able to operate as described above. However, it is also desirable that some coordination occur between the local network devices. For example, if there is a data transfer between two local network devices it may not be necessary to determine whether a sink device will overload LAN 16 and whether the source device will overload LAN 16 as this would be a duplication. Such coordination may be for example that only sink data transfer requests are checked. In another example, uploads are only checked if they are to another network segment via WAN 12 (or gateway 14). In another example, access link 13 is assessed when the source or destination address (for example IP address) is not part of the local network.

In one embodiment, the network may comprise network device 24, which forms a virtual part of the local network segment, that is, network device 24 is addressable as if it were part of LAN 16, but physically it can be a remote device that connects to LAN 16 via WAN 12. In this embodiment, network segment 10 may comprise a tunneling or redirection device that redirects data transfers to or from network segment 10 over WAN 12 to or from network device 24. One of gateway 14, computing devices 52 or 54, or network devices 20 or 22 may be the redirection device. The redirection device may be a different device on LAN 16. In the embodiment shown in FIG. 1, device 22 operates as the redirection device. In one embodiment, when network device 18 requests the transfer rate being used by network device 24, the redirection device will return a transfer rate being used by the device 24. In one embodiment, when network device 18 requests the available transfer rate to network device 24, the redirection device will return the available (unused) transfer rate to the device 24. This may take into account the transfer rate of access link 13 even though network device 18 may realize that the device 24 is accessed via access link 13. Alternatively device 24 may know that it is not physically part of network segment 10 and can, therefore, inform network device 18 that it will need to assess access link 13. As a further alternative, network device 18 may be able to determine that device 24 is not local as described above.

Capacity information does not necessarily need to be available from the other devices, provided the number of devices consuming capacity can be accurately determined, the capacity of each stream could be estimated if the queried device returns the format of the stream it is consuming. The data transfer rate amounts may be based on peak bandwidth, average bandwidth, or both. It is desirable that the calculations are consistent in the type of bandwidth used. However, a conversion factor may be applied from one to the other if necessary. Embodiments therefore allow, for example, network devices in the home to self-regulate based on learning what the upstream and downstream capacities are in the network.

In operation of an example flow that can highlight some of the teachings of example embodiments, an assumption is made that no changes to the residential gateway are allowed. The following methods can be used to perform a self-regulated (and distributed) bandwidth management. For illustrative purposes, first consider the case of IPTV and multiple STBs consuming and, possibly oversubscribing, downstream capacity. Assume that an IP STB requests an IPTV stream. Also assume that it knows a priori how much capacity that stream requires (i.e., it has learned this prior to choosing the stream). Typically, this information is made available by the entity sourcing the stream. Also assume that some in-home bandwidth manager has already decided that admitting that stream will not oversubscribe the in-home capacity and, thus, allows the stream.

The IP STB could determine if it is joining a stream that has already been admitted. Since IPTV is based on IP multicast, there will be no additional capacity consumed if an existing stream is requested. The IP STB could next query all other IP STBs (and all other sinks) in the home as to what capacity they are currently utilizing (this could be accomplished via UPnP AV, UPnP QoS, or other mechanisms). In regards to multicast snooping by endpoints, ordinarily intermediate devices snoop multicast traffic for joins and leaves. In one example, endpoint devices can perform multicast snooping in order to track joins and leaves for the purpose of bandwidth accounting. In regards to multicast awareness for UPnP AV and QoS, ordinarily UPnP AV (and QoS) only setup streams (and request QoS) for unicast flows. An embodiment of this invention could allow multicast streams to be added via UPnP AV. Adding multicast awareness to the UPnP QoS endpoints (and QoS Manager) could mean that a QoS request for multicast in the home will only be setup by the first multicast device joining a group and will not be torn down until the last multicast device to join a group leaves. Furthermore, this allows UPnP QoS to be setup for different physical paths in the home (e.g., an IP STBs on wireless and an IP STB on powerline can join the same multicast group and not consumer additional downstream, but would require different in-home paths for QoS setup and bandwidth accounting).

The IP STB could next query the residential gateway as to what the currently available downstream total capacity is (e.g., this can be done via UPnP IGD or TR-064 or other mechanisms). If available, the IPSTB could specifically query as to the capacity allocated for video. If this is not available, then the total capacity could be requested, and some conservative estimate could be used for estimating the percentage of downstream allocated to video (note: this is typically the majority of the capacity). The IP STB could then subtract the sum of all sink capacity utilization (sum of individual downstreams for aggregate total downstream consumption) from the currently available total downstream capacity and compare that to the requested capacity. If the requested capacity is equal to or greater than the difference calculated, the IP STB could not request the stream and could inform the user than the access network is busy and optionally inform the user that the home network is fine (this could aid in a tech support resolution). Note that depending on conservatism of estimation, if the calculation shows that the request does not exceed available capacity but comes near to doing so, there could be a voluntary withdrawal of the request. Such an algorithm for bandwidth calculation is self regulating and decentralizes the nature of the admission control. Ordinarily it is not the requesting device that determines if the network can honor the request. Also, typically there is a centralized bandwidth manager. Furthermore, in this instance, it is the requesting device that also determines if the next network can honor the request by interrogating the device that provides access to the next network.

As counterpoint, a VoIP device can perform a similar function for upstream. In this example flow, assume that a VoIP phone initiates a call. Also assume that it knows a priori how much capacity that stream requires (this is not unusual since it will choose the codec for the call). Also assume that some in-home bandwidth manager has already decided that admitting that stream will not oversubscribe the in-home capacity and, thus, allows the stream. The VoIP phone could next query the residential gateway as to what the currently available upstream total capacity is (e.g., this can be done via UPnP IGD or TR-064 or other mechanisms). If available, the VoIP phone could specifically query as to the capacity allocated for voice. If this is not available, then the total capacity could be requested and some conservative estimate could be used for estimating the percentage of upstream allocated to voice. The VoIP phone could next query all other VoIP phone (and all other sources) in the home as to what capacity they are currently utilizing (this could be accomplished via UPnP AV, UPnP QoS, or other mechanisms).

The VoIP phone could then subtract the sum of all source capacity utilization (sum of individual upstreams for aggregate total upstream consumption) from the currently available total upstream capacity and compare that to the requested capacity. If the requested capacity is equal to or greater than the difference calculated, the VoIP phone could not request the stream and could inform the user than the access network is busy and optionally inform the user that the home network is fine. Any type of such notification is considered to be a 'congestion status' as used herein in this Specification. Note that depending on conservatism of estimation, if the calculation shows that the request does not exceed available capacity but comes near to doing so, there could be a voluntary withdrawal of request. A similar proposal could be made for a video conferencing over IP terminal. Capacity information does not need to be available from other devices. Provided the number of devices consuming capacity can be accurately determined, the capacity of each stream could be estimated if the queried device returns the format of the stream it is consuming. It is also worthwhile to note that, as with any bandwidth management scheme, the accuracy of the information depends on whether peak bandwidth, average bandwidth, or both is returned in the queries and calculation.

As explained above, a computing device and/or network device 18 may perform the bandwidth management activities as highlighted herein. Both of these devices are network elements and, as used herein in this Specification, the term 'network element' is meant to encompass routers, set-top boxes, IP-phones, PDAs, switches, any type of gateways, bridges, loadbalancers, firewalls, or any other suitable device, component, element, or object operable to exchange information in a network environment. Moreover, a computing device and/or network device 18 may include any suitable hardware, software, components, processors, modules, interfaces, or objects that facilitate the operations thereof. This may be inclusive of appropriate algorithms and communication protocols that allow for the effective exchange of data or information.

One or more tables may also be included in the computing device and/or network device 18. In other embodiments, these tables may be provided externally to the computing device and/or network device 18, or consolidated in any suitable fashion. The tables can be memory elements for storing information to be referenced by their corresponding the computing device and/or network device 18. As used herein in this document, the term 'table' is inclusive of any suitable database or storage medium (provided in any appropriate format) that is capable of maintaining information pertinent to the bandwidth activities and/or processing operations of the proposed architecture. For example, the tables may store information in an electronic register, diagram, record, index, list, or queue. Alternatively, the tables may keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

In one example implementation, the computing device and/or network device 18 includes software to achieve the bandwidth management operations, as outlined herein in this document. In other embodiments, this feature may be provided external to the computing device and/or network device 18 or included in some other network element to achieve this intended functionality. Alternatively, both the computing device and/or network device 18 and some other network appliance include this software (or reciprocating software) that can coordinate in order to achieve the operations, as outlined herein. In still other embodiments, one or both of these devices may include any suitable algorithms, hardware, software, components, modules, interfaces, or objects that facilitate the operations thereof. This may be inclusive of appropriate communication protocols that allow for the effective exchange of data or information for achieving bandwidth management in a network environment.

The computing device and/or network device 18 can also include memory elements for storing information to be used in achieving the bandwidth management activities, as outlined herein. Additionally, each computing device and/or network device 18 may include a processor (or multiple processors) that can execute software or an algorithm associated with the bandwidth management activities, as discussed in this Specification. The computing device and/or network device 18 may further keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the proffered system (and its teachings) are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the steps outlined above illustrate only some of the possible scenarios that may be executed by, or within, the system. Some of these steps may be deleted or removed where appropriate, or these steps may be modified or changed considerably without departing from the scope of the described concept. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the proffered architecture in that any suitable arrangements, chronologies, configurations, and timing mechanisms may be provided without departing from the teachings of the described concept.

Although the described concept has been described in detail with reference to particular arrangements and configurations, these example configurations and arrangements may be changed significantly without departing from the scope of the described concept. For example, although the described concept has been described with reference to particular communication exchanges involving certain residential protocols and home environments, the system may be applicable to other protocols in which packets (not necessarily the packets described) are exchanged in order to provide bandwidth management for one or more endpoints or various network segments. Moreover, the presented system may be applicable to any suitable element or component within the network that seeks to control bandwidth activities.

Numerous other changes, substitutions, variations, alterations, and modifications may be ascertained to one skilled in the art and it is intended that the described concept encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method, comprising:
   querying for a total capacity for data transmissions for a local network segment;
   identifying an available capacity for the local network segment by subtracting a sum of current aggregate consumption of the local network segment from the total capacity; and
   comparing the available capacity to a requested capacity, which is provided in a request that is generated by a network element for a specific communication session associated with an Internet Protocol Television (IPTV) stream, wherein if the requested capacity is equal to or greater than the available capacity, the request is withheld and not transmitted by the network element, and wherein if the requested capacity for the communication session brings an access link to near capacity, then the network element signals a near capacity condition to an end user for electing whether to withdraw the request.

2. The method of claim 1, wherein if the requested capacity is less than the available capacity, the request is transmitted.

3. The method of claim 1, wherein the query is communicated to a gateway.

4. The method of claim 1, wherein the query includes a specific query as to a capacity allocated for video data and the network element is a set-top box.

5. The method of claim 1, wherein an additional query includes a specific query as to a capacity allocated for voice data and the network element is an internet protocol (IP) phone.

6. The method of claim 1, further comprising:
providing a notification of a congestion status in a network such that the request is not being transmitted.

7. The method of claim 1, wherein the query is sent via a universal plug and play (UPnP) protocol.

8. The method of claim 1, wherein the query is sent via a technical report-064 (TR-064) protocol.

9. An apparatus, comprising:
a network element configured to query for a total capacity for data transmissions for a local network segment, the network element configured to subtract a sum of current aggregate consumption of the local network segment from the total capacity to identify an available capacity for the local network segment, and wherein the available capacity is compared to a requested capacity, which is provided in a request that is generated by the network element for a specific communication session associated with an Internet Protocol Television (IPTV) stream, and if the requested capacity is equal to or greater than the available capacity, the network element is configured to withhold transmitting the request, and wherein if the requested capacity for the communication session brings an access link to near capacity, then the network element signals a near capacity condition to an end user for electing whether to withdraw the request.

10. The apparatus of claim 9, wherein if the requested capacity is less than the available capacity, the network element is configured to transmit the request.

11. The apparatus of claim 9, wherein the network element is configured to communicate the query to a gateway.

12. The apparatus of claim 9, wherein the query includes a specific query as to a capacity allocated for video data and the network element is a set-top box.

13. The apparatus of claim 9, wherein an additional query includes a specific query as to a capacity allocated for voice data and the network element is an internet protocol (IP) phone.

14. The apparatus of claim 9, wherein the network element is configured to provide a notification of a congestion status in a network such that the request is not being transmitted.

15. The apparatus of claim 9, wherein the query is executed using a universal plug and play (UPnP) protocol.

16. The apparatus of claim 9, wherein the query is executed using a technical report-064 (TR-064) protocol.

17. A system, comprising:
means for querying for a total capacity for data transmissions for a local network segment;
means for identifying an available capacity for the local network segment by subtracting a sum of current aggregate consumption of the local network segment from the total capacity; and
means for comparing the available capacity to a requested capacity, which is provided in a request that is generated by a network element for a specific communication session associated with an Internet Protocol Television (IPTV) stream, wherein if the requested capacity is equal to or greater than the available capacity, the request is withheld and not transmitted by the network element, and wherein if the requested capacity for the communication session brings an access link to near capacity, then the network element signals a near capacity condition to an end user for electing whether to withdraw the request.

18. The system of claim 17, wherein if the requested capacity is less than the available capacity, the request is transmitted.

19. The system of claim 17, wherein the query is communicated to a gateway, and wherein the query includes a specific query as to a capacity allocated for video data and the network element is a set-top box.

20. Logic encoded in one or more non-transitory tangible media for execution and when executed by a processor operable to:
query for a total capacity for data transmissions for a local network segment;
identify an available capacity for the local network segment by subtracting a sum of current aggregate consumption of the local network segment from the total capacity; and
means for comparing the available capacity to a requested capacity, which is provided in a request that is generated by a network element for a specific communication session associated with an Internet Protocol Television (IPTV) stream, wherein if the requested capacity is equal to or greater than the available capacity, the request is withheld and not transmitted by the network element, and wherein if the requested capacity for the communication session brings an access link to near capacity, then the network element signals a near capacity condition to an end user for electing whether to withdraw the request.

21. The logic of claim 20, wherein if the requested capacity is less than the available capacity, the request is transmitted.

22. The logic of claim 20, wherein the query is communicated to a gateway.

23. The logic of claim 20, wherein the query includes a specific query as to a capacity allocated for video data and the network element is a set-top box.

24. The logic of claim 20, wherein an additional query includes a specific query as to a capacity allocated for voice data and the network element is an internet protocol (IP) phone.

* * * * *